US011462771B2

(12) United States Patent
Abe

(10) Patent No.: US 11,462,771 B2
(45) Date of Patent: Oct. 4, 2022

(54) NONAQUEOUS ELECTROLYTE SOLUTION AND ELECTRICITY STORAGE DEVICE USING SAME

(71) Applicant: MU IONIC SOLUTIONS CORPORATION, Tokyo (JP)

(72) Inventor: Koji Abe, Ube (JP)

(73) Assignee: MU IONIC SOLUTIONS CORPORATION, Tokyo (JP)

( * ) Notice: Subject to any disclaimer, the term of this patent is extended or adjusted under 35 U.S.C. 154(b) by 484 days.

(21) Appl. No.: 16/469,385

(22) PCT Filed: Dec. 11, 2017

(86) PCT No.: PCT/JP2017/044317
§ 371 (c)(1),
(2) Date: Jun. 13, 2019

(87) PCT Pub. No.: WO2018/116879
PCT Pub. Date: Jun. 28, 2018

(65) Prior Publication Data
US 2019/0312310 A1    Oct. 10, 2019

(30) Foreign Application Priority Data

Dec. 22, 2016 (JP) .............................. JP2016-249428

(51) Int. Cl.
| | |
|---|---|
| *H01M 10/0568* | (2010.01) |
| *H01M 10/0525* | (2010.01) |
| *H01M 10/0569* | (2010.01) |
| *H01G 11/60* | (2013.01) |
| *H01M 12/06* | (2006.01) |
| *H01G 11/64* | (2013.01) |
| *H01M 10/052* | (2010.01) |
| *H01M 6/16* | (2006.01) |
| *H01M 10/0567* | (2010.01) |

(52) U.S. Cl.
CPC ........ *H01M 10/0568* (2013.01); *H01G 11/60* (2013.01); *H01G 11/64* (2013.01); *H01M 6/16* (2013.01); *H01M 10/052* (2013.01); *H01M 10/0525* (2013.01); *H01M 10/0567* (2013.01); *H01M 10/0569* (2013.01); *H01M 12/06* (2013.01); *H01M 2300/0028* (2013.01); *Y02E 60/10* (2013.01); *Y02T 10/70* (2013.01)

(58) Field of Classification Search
CPC ............................................... H01M 10/0569
See application file for complete search history.

(56) References Cited

U.S. PATENT DOCUMENTS

| | | | | |
|---|---|---|---|---|
| 6,506,524 B1* | 1/2003 | McMillan | ............ | H01M 4/1393 429/324 |
| 2005/0019659 A1* | 1/2005 | Shiozaki | ............ | C01G 45/1242 429/231.3 |
| 2008/0081261 A1 | 4/2008 | Takahashi | | |
| 2008/0118846 A1* | 5/2008 | Lee | ........................ | H01M 4/131 429/341 |
| 2009/0130566 A1 | 5/2009 | Iwanaga et al. | | |
| 2013/0052543 A1 | 2/2013 | Ihara et al. | | |
| 2014/0220429 A1 | 8/2014 | Chiga et al. | | |

FOREIGN PATENT DOCUMENTS

| | | |
|---|---|---|
| CN | 102142576 A | 8/2011 |
| JP | 2000-12031 A | 1/2000 |
| JP | 2001-332238 A | 11/2001 |
| JP | 2008-84705 A | 4/2008 |
| JP | 2009-140919 A | 6/2009 |
| JP | 2009-237030 A | 10/2009 |
| JP | 2011-129420 A | 6/2011 |
| JP | 2012-36141 A | 2/2012 |
| JP | 2012-38630 A | 2/2012 |
| JP | 2013-225388 A | 10/2013 |
| WO | WO 2013/047502 A1 | 4/2013 |

OTHER PUBLICATIONS

International Search Report dated Jan. 16, 2018 in PCT/JP2017/044317 filed on Dec. 11, 2017.

* cited by examiner

*Primary Examiner* — Peter F Godenschwager
(74) *Attorney, Agent, or Firm* — Oblon, McClelland, Maier & Neustadt, L.L.P.

(57) ABSTRACT

The present invention relates to a nonaqueous electrolytic solution having an electrolyte salt dissolved in a nonaqueous solvent, the nonaqueous electrolytic solution containing 0.1 to 5% by mass of a compound represented by the following general formula (I) and an energy storage device including the foregoing nonaqueous electrolytic solution. This nonaqueous electrolytic solution is able to improve charging storage properties and discharging storage properties of an energy storage device when used in the high-temperature and high-voltage environment.

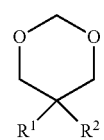

(I)

In the formula, $R^1$ and $R^2$ each independently represent an alkyl group having 1 to 4 carbon atoms.

17 Claims, No Drawings

NONAQUEOUS ELECTROLYTE SOLUTION AND ELECTRICITY STORAGE DEVICE USING SAME

TECHNICAL FIELD

The present invention relates to a nonaqueous electrolytic solution capable of improving charging storage properties and discharging storage properties of an energy storage device when used in the high-temperature and high-voltage environment, and an energy storage device using the same.

BACKGROUND ART

A lithium ion secondary battery and a lithium ion capacitor have been recently watched as a power source for a vehicle, such as an electric vehicle, a hybrid car, or for idle reduction.

As an electrolytic solution of a lithium secondary battery, a nonaqueous electrolytic solution in which an electrolyte, such as $LiPF_6$ and $LiBF_4$, is dissolved in a cyclic carbonate, such as ethylene carbonate and propylene carbonate, and a linear carbonate, such as dimethyl carbonate, diethyl carbonate, and ethyl methyl carbonate, is used.

In order to improve battery characteristics of such a lithium secondary battery, such as cycle properties and storage properties, a variety of investigations regarding a nonaqueous solvent or an electrolyte to be used for such a nonaqueous electrolytic solution are made.

For example, PTL 1 discloses a nonaqueous electrolyte secondary battery including a nonaqueous electrolyte containing a nonaqueous solvent, an electrolyte salt, 1,3-dioxane, and a sulfonic acid ester and mentions that an initial capacity, cycle properties, and charging storage properties of a nonaqueous electrolyte secondary battery capable of achieving high-voltage charging at which a potential of a positive electrode active material is more than 4.3 V can be improved.

PTL 2 discloses an electrolytic solution for a secondary battery containing $Li_2PFO_3$ or $LiPF_2O_2$ and a dioxane compound.

Now, in the case where the lithium secondary battery is kept in a charged state over a long period of time in the high-temperature and high-voltage environment (for example, in the environment where the temperature is higher than 50° C., such as the inside of a car in midsummer), in the battery, a part of the nonaqueous solvent causes oxidative decomposition on the surface of a positive electrode, thereby causing deposition of decomposed products or electrolyte depletion due to generation of a gas. If that is the case, there is involved such a problem that interfacial resistance of the positive electrode increases, thereby worsening desired electrochemical characteristics of the battery.

Meanwhile, in the case where the lithium secondary battery is kept in a discharged state over a long period of time after being used at a high voltage in the high-temperature environment, a surface film on the surface of a negative electrode is dissolved, whereby an active surface of the negative electrode locally appears. If that is the case, the active surface reacts with a part of the nonaqueous solvent to cause self-discharge, so that the potential of the negative electrode increases. In particular, a series of reactions is accelerated in the high-temperature environment, and therefore, there is involved such a problem that the battery becomes in an over-discharged state, and the negative electrode collector becomes to dissolve, thereby worsening desired electrochemical characteristics of the battery.

CITATION LIST

Patent Literature

PTL 1: JP 2009-140919 A
PTL 2: JP 2011-129420 A

SUMMARY OF INVENTION

Technical Problem

An object of the present invention is to provide a nonaqueous electrolytic solution capable of improving charging storage properties and discharging storage properties of an energy storage device when used in the high-temperature and high-voltage environment, and an energy storage device using the same.

Solution to Problem

According to the proposal of PTL 1 regarding mixing and addition of 1,3-dioxane and a sulfonic acid ester, a certain effect regarding the charging storage properties is obtained; however, the improvement of the discharging properties when stored in a charged state over a long period of time in the high-temperature after being used in the high-temperature and high-voltage environment is neither described nor suggested, and it is the actual situation that a satisfactory effect is not obtained.

PTL 2 proposes that when the nonaqueous electrolytic solution contains a 1,3-dioxane compound and $LiPF_2O_2$, etc., the cycle properties, the storage properties, and the load properties at 4.2 V are improved; however, it is the actual situation that the disclosed electrolytic solution is not sufficient with respect to its performances in an environment at a higher voltage.

Then, in order to solve the aforementioned problem, the present inventor made extensive and intensive investigations. As a result, it has been found that in a nonaqueous electrolytic solution having an electrolyte salt dissolved in a nonaqueous solvent, when the nonaqueous electrolytic solution contains a compound having two alkyl substituents at the 5-position of 1,3-dioxane, the charging storage properties and the discharging storage properties of an energy storage device are remarkably improved when used in the high-temperature and high-voltage environment, thereby leading to accomplishment of the present invention.

Specifically, the present invention provides the following (1) and (2).

(1) A nonaqueous electrolytic solution for an energy storage device, which has an electrolyte salt dissolved in a nonaqueous solvent, the nonaqueous electrolytic solution containing 0.1 to 5% by mass of a compound represented by the following general formula (I):

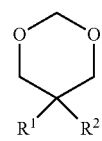

(I)

wherein $R^1$ and $R^2$ each independently represent an alkyl group having 1 to 4 carbon atoms.

(2) An energy storage device including a positive electrode, a negative electrode, and a nonaqueous electrolytic solution having an electrolyte salt dissolved in a nonaqueous solvent, the nonaqueous electrolytic solution being the nonaqueous electrolytic solution as set forth in the above (1).

Advantageous Effects of Invention

In accordance with the present invention, it is possible to provide a nonaqueous electrolytic solution capable of improving charging storage properties and discharging storage properties of an energy storage device when used in the high-temperature and high-voltage environment, and an energy storage device using the same, such as a lithium battery.

DESCRIPTION OF EMBODIMENTS

The present invention relates to a nonaqueous electrolytic solution and an energy storage device using the same.
[Nonaqueous Electrolytic Solution]
The nonaqueous electrolytic solution of the present invention is a nonaqueous electrolytic solution having an electrolyte salt dissolved in a nonaqueous solvent, the nonaqueous electrolytic solution containing 0.1 to 5% by mass of a compound represented by the aforementioned general formula (I).

Though reasons why the nonaqueous electrolytic solution of the present invention is able to improve the charging storage properties and the discharging storage properties of an energy storage device when used in the high-temperature and high-voltage environment are not always elucidated yet, the following may be considered.

The compound represented by the general formula (I) which is used in the present invention has two alkyl substituents at the 5-position of 1,3-dioxane. From this fact, it may be considered that a decomposition reaction on an active surface of an electrode is promoted as compared with the case of unsubstituted 1,3-dioxane, whereby a surface film is quickly formed on the electrode surface.

Meanwhile, in the case of having a substituent at the 4-position of 1,3-dioxane or in the case of having one alkyl substituent at the 5-position of 1,3-dioxane, the decomposition reaction excessively proceeds. Therefore, satisfactory effects regarding the charging storage properties and the discharging storage properties of the energy storage device when used in the high-temperature and high-voltage environment cannot be obtained.

That is, it may be considered that the compound of the present invention has peculiarly favorable reactivity in view of the fact that the compound of the present invention has two alkyl substituents at the 5-position of 1,3-dioxane. Such reactivity is neither described nor reviewed in PTLs 1 and 2.

With respect to the compound represented by the general formula (I), a part of its reductive decomposition product also acts on a positive electrode surface, and when used in combination with a nitrile compound, a surface film having high thermal stability is formed, whereby not only the charging storage properties and the discharging storage properties are more improved, but also the metal elution can be reduced. Furthermore, it has become clear that as for a nonaqueous electrolytic solution containing a linear ester, especially a linear carboxylic acid ester, the charging storage properties and the discharging storage properties when used at a high voltage are much more improved.

The compound which is included in the nonaqueous electrolytic solution of the present invention is represented by the following general formula (I).

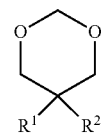

(I)

In the formula, $R^1$ and $R^2$ each independently represent an alkyl group having 1 to 4 carbon atoms.

In the general formula (I), the carbon number of each of $R^1$ and $R^2$ is preferably 1 to 3, and more preferably 1 or 2.

As specific examples of $R^1$ and $R^2$ in the general formula (I), a straight-chain alkyl group, such as a methyl group, an ethyl group, a n-propyl group, and a n-butyl group; and a branched alkyl group, such as an isopropyl group, an isobutyl group, and a sec-butyl group, are suitably exemplified. Above all, a methyl group, an ethyl group, or a n-propyl group is preferred, and a methyl group or an ethyl group is more preferred.

The case of an asymmetric compound in which $R^1$ and $R^2$ in the general formula (I) are different from each other is more preferred because not only the increase of resistance at the time of charging storage can be suppressed, but also the metal elution amount can be reduced.

As specific examples of the case where $R^1$ and $R^2$ are different from each other, at least one combination selected from a combination of a methyl group and an ethyl group, a combination of a methyl group and a n-propyl group, a combination of a methyl group and a n-butyl group, a combination of an ethyl group and a n-propyl group, a combination an ethyl group and a n-butyl group, and a combination of a n-propyl group and a n-butyl group, is suitably exemplified. Of these, at least one combination selected from a combination of a methyl group and an ethyl group, a combination of a methyl group and a n-propyl group, and a combination of an ethyl group and a n-butyl group is more preferred.

In the nonaqueous electrolytic solution of the present invention, as specific examples of the general formula (I), compounds represented by the following structural formulae are suitably exemplified.

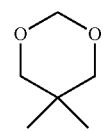

1

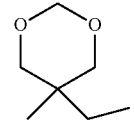

2

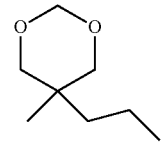

3

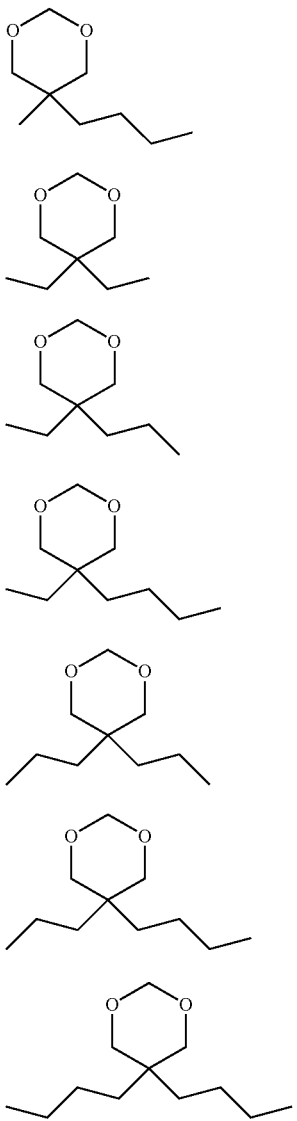

Among the aforementioned compounds, one or more selected from the group consisting of 5,5-dimethyl-1,3-dioxane (structural formula 1), 5-ethyl-5-methyl-1,3-dioxane (structural formula 2), 5-methyl-5-propyl-1,3-dioxane (structural formula 3), 5,5-diethyl-1,3-dioxane (structural formula 5), 5-ethyl-5-propyl-1,3-dioxane (structural formula 6), and 5-butyl-5-ethyl-1,3-dioxane (structural formula 7) are more preferred; one or more selected from the group consisting of 5,5-dimethyl-1,3-dioxane (structural formula 1), 5-ethyl-5-methyl-1,3-dioxane (structural formula 2), 5-methyl-5-propyl-1,3-dioxane (structural formula 3), 5-ethyl-5-propyl-1,3-dioxane (structural formula 6), and 5-butyl-5-ethyl-1,3-dioxane (structural formula 7) are still more preferred; and one or more selected from the group consisting of 5-ethyl-5-methyl-1,3-dioxane (structural formula 2), 5-methyl-5-propyl-1,3-dioxane (structural formula 3), 5-ethyl-5-propyl-1,3-dioxane (structural formula 6), and 5-butyl-5-ethyl-1,3-dioxane (structural formula 7) are especially preferred.

In the nonaqueous electrolytic solution of the present invention, the content of the compound represented by the general formula (I) is 0.1 to 5% by mass in the nonaqueous electrolytic solution. When the foregoing content is 5% by mass or less, there is less concern that a surface film is excessively formed on the electrode and the electrochemical characteristics are worsened. In addition, when the content is 0.1% by mass or more, the formation of a surface film is sufficient, and the effect for improving the charging storage properties is enhanced. The foregoing content is preferably 0.3% by mass or more, and more preferably 0.5% by mass or more in the nonaqueous electrolytic solution. In addition, an upper limit thereof is preferably 2.7% by mass or less, more preferably 2.2% by mass or less, and still more preferably 1.4% by mass or less.

In the nonaqueous electrolytic solution of the present invention, by further using at least one compound selected from the group consisting of (A) a nitrile compound, (B) an aromatic compound, (C) an isocyanate compound, (D) an S(=O) group-containing compound, (E) a phosphorus-containing compound, (F) a cyclic acid anhydride, (G) a phosphazene compound, and (H) a carbon-carbon triple bond-containing compound, in combination with the compound represented by the general formula (I), the both act on the surface of the positive electrode in cooperation with each other, thereby forming a surface film having high thermal stability. Therefore, not only the increase of resistance at the time of charging storage is suppressed, but also the effect for reducing the metal elution is enhanced, and hence, such is preferred.

Suitable examples of these compounds (A) to (H) are as follows.

Examples of the nitrile compound (A) include mononitriles and polyvalent nitriles.

Examples of the mononitrile include acetonitrile and propionitrile. Examples of the polyvalent nitrile include dinitriles, such as succinonitrile, glutaronitrile, adiponitrile, pimelonitrile, suberonitrile, and sebaconitrile; and trinitriles, such as 1,2,3-propanetricarbonitrile, 1,3,5-pentanetricarbonitrile 1,3,5-hexanetricarbonitrile, and 1,3,6-hexanetricarbonitrile.

Of the nitrile compounds (A), polyvalent nitriles, such as dinitriles and trinitriles are preferred; polyvalent nitriles having two or more intermediate carbon chains between the CN group and the CN group, such as one or more selected from the group consisting of succinonitrile, glutaronitrile, adiponitrile, pimelonitrile, suberonitrile, sebaconitrile, 1,3,5-hexanetricarbonitrile, 1,3,6-hexanetricarbonitrile, 1,2,3-propanetricarbonitrile, and 1,3,5-pentanetricarbonitrile, are more preferred because of a high effect for suppressing the metal elution in the high-temperature environment; polyvalent nitriles having 5 or more and 8 or less intermediate carbon chains between the CN group and the CN group, such as one or more selected from the group consisting of pimelonitrile, suberonitrile, and sebaconitrile, are still more preferred; and one or more selected from the group consisting of pimelonitrile, suberonitrile, and sebaconitrile are yet still preferred.

Examples of the aromatic compound (B) include aromatic compounds having a branched alkyl group, such as cyclohexylbenzene, tert-butylbenzene, tert-amylbenzene, and 1-fluoro-4-tert-butylbenzene; and one or more aromatic compounds selected from the group consisting of biphenyl, terphenyl (including o-, m-, and p-forms), fluorobenzene, methyl phenyl carbonate, ethyl phenyl carbonate, and diphenyl carbonate.

Of the aromatic compounds (B), one or more selected from the group consisting of cyclohexylbenzene, tert-amylbenzene, biphenyl, o-terphenyl, fluorobenzene, methyl phenyl carbonate, and diphenyl carbonate are preferred.

Examples of the isocyanate compound (C) include one or more isocyanate compounds selected from the group consisting of methyl isocyanate, ethyl isocyanate, butyl isocyanate, phenyl isocyanate, tetramethylene diisocyanate, hexamethylene diisocyanate, octamethylene diisocyanate, 1,4-phenylene diisocyanate, 2-isocyanatoethyl acrylate, and 2-isocyanatoethyl methacrylate.

Examples of the S(=O) group-containing compound (D) include one or more selected from the group consisting of an —OS(=O)O— group-containing compound, an —S(=O)$_2$— group-containing compound, an —S(=O)$_2$O— group-containing compound, and an —OS(=O)$_2$O— group-containing compound.

Examples of the —OS(=O)O— group-containing compound include cyclic sulfites, such as ethylene sulfite.

Examples of the —S(=O)$_2$— group-containing compound include vinyl sulfone compounds, such as divinyl sulfone, 1,2-bis(vinylsulfonyl)ethane, and bis(2-vinylsulfonylethyl) ether.

Examples of the —S(=O)$_2$O— group-containing compound include sultones, such as 1,3-propane sultone, 1,3-butane sultone, 1,4-butane sultone, 2,4-butane sultone, 1,3-propene sultone, and 2,2-dioxide-1,2-oxathiolane-4-yl acetate and sulfonic acid esters, such as methylene methanedisulfonate, butane-2,3-diyl dimethanesulfonate, butane-1,4-diyl dimethanesulfonate, dimethyl methanedisulfonate, and pentafluorophenyl methanesulfonate.

Examples of the —OS(=O)$_2$O— group-containing compound include sulfates, such as ethylene sulfate, (2,2-dioxide-1,3,2-dioxathiolane-4-yl)methyl methanesulfonate, tetrahydro-4H-cyclopenta[d][1,3,2]dioxathiole-2,2-dioxide, and 4-((methylsulfonyl)methyl)-1,3,2-dioxathiolane-2,2-dioxide.

Of the S(=O) group-containing compounds (D), one or more selected from the —S(=O)$_2$O— group-containing compounds and the —OS(=O)$_2$O— group-containing compounds are preferred; and one or more selected from the —S(=O)$_2$O— group-containing compounds selected from the aforementioned sultones, such as 1,3-propane sultone, and the aforementioned sulfonic acid esters, such as pentafluorophenyl methanesulfonate, and the OS(=O)$_2$O— group-containing compounds, such as ethylene sulfate and tetrahydro-4H-cyclopenta[d][1,3,2]dioxathiole-2,2-dioxide are more preferred.

Examples of the phosphorus-containing compound (E) include one or more phosphorus-containing compounds selected from the group consisting of trimethyl phosphate, tributyl phosphate, trioctyl phosphate, tris(2,2,2-trifluoroethyl) phosphate, bis(2,2,2-trifluoroethyl)methyl phosphate, bis(2,2,2-trifluoroethyl)ethyl phosphate, bis(2,2,2-trifluoroethyl) 2,2-difluoroethyl phosphate, bis(2,2,2-trifluoroethyl) 2,2,3,3-tetrafluoropropyl phosphate, bis(2,2-difluoroethyl) 2,2,2-trifluoroethyl phosphate, bis(2,2,3,3-tetrafluoropropyl) 2,2,2-trifluoroethyl phosphate, (2,2,2-trifluoroethyl) (2,2,3,3-tetrafluoropropyl)methyl phosphate, tris(1,1,1,3,3,3-hexafluoropropan-2-yl) phosphate, methyl methylenebisphosphonate, ethyl methylenebisphosphonate, methyl ethylenebisphosphonate, ethyl ethylenebisphosphonate, methyl butylenebisphosphonate, ethyl butylenebisphosphonate, methyl 2-(dimethoxyphosphoryl)acetate, ethyl 2-(dimethoxyphosphoryl) acetate, methyl 2-(diethoxyphosphoryl) acetate, ethyl 2-(diethoxyphosphoryl)acetate, ethyl 2-(diethylphosphoryl) acetate, 2-propynyl 2-(dimethoxyphosphoryl) acetate, 2-propynyl 2-(diethoxyphosphoryl) acetate, 2-propynyl 2-(diethylphosphoryl)acetate, methyl pyrophosphate, and ethyl pyrophosphate.

Of the phosphorus-containing compounds (E), one or more selected from the group consisting of tris(2,2,2-trifluoroethyl) phosphate, tris(1,1,1,3,3,3-hexafluoropropan-2-yl) phosphate, methyl 2-(dimethoxyphosphoryl)acetate, ethyl 2-(dimethoxyphosphoryl) acetate, methyl 2-(diethoxyphosphoryl)acetate, 2-propynyl 2-(diethylphosphoryl)acetate, ethyl 2-(diethoxyphosphoryl)acetate, 2-propynyl 2-(dimethoxyphosphoryl)acetate, and 2-propynyl 2-(diethoxyphosphoryl)acetate are preferred; and one or more selected from the group consisting of tris(2,2,2-trifluoroethyl) phosphate, tris(1,1,1,3,3,3-hexafluoropropan-2-yl) phosphate, ethyl 2-(diethylphosphoryl) acetate, 2-propynyl 2-(dimethylphosphoryl) acetate, 2-propynyl 2-(diethylphosphoryl)acetate, ethyl 2-(diethoxyphosphoryl) acetate, 2-propynyl 2-(dimethoxyphosphoryl) acetate, and 2-propynyl 2-(diethoxyphosphoryl)acetate are more preferred.

Examples of the cyclic acid anhydride (F) include one or more selected from the group consisting of succinic anhydride, maleic anhydride, 3-allylsuccinic anhydride, glutaric anhydride, itaconic anhydride, and 3-sulfo-propionic anhydride.

Of the cyclic acid anhydrides (F), one or more selected from the group consisting of succinic anhydride, maleic anhydride, and 3-allylsuccinic anhydride are preferred, and succinic anhydride or 3-allylsuccinic anhydride is more preferred.

Examples of the phosphazene compound (G) include one or more cyclic phosphazene compounds selected from the group consisting of methoxypentafluorocyclotriphosphazene, ethoxypentafluorocyclotriphosphazene, phenoxypentafluorocyclotriphosphazene, and ethoxyheptafluorocyclotetraphosphazene.

Examples of the carbon-carbon triple bond-containing compound (H) include one or more selected from the group consisting of 2-propynyl methyl carbonate, 2-propynyl methacrylate, 2-propynyl methanesulfonate, 2-propynyl vinylsulfonate, 2-propynyl 2-(methanesulfonyloxy)propionate, di(2-propynyl) oxalate, methyl 2-propynyl oxalate, ethyl 2-propynyl oxalate, and 2-butyne-1,4-diyl dimethanesulfonate.

The content of each of the compounds (A) to (H) is preferably 0.1 to 7% by mass in the nonaqueous electrolytic solution. When the foregoing content falls within this range, a surface film is sufficiently formed without causing an excessive increase of the thickness, and the electrochemical characteristics in the high-temperature environment are more enhanced. The foregoing content is more preferably 0.5% by mass or more, still more preferably 1% by mass or more, and especially preferably 1.5% by mass or more in the nonaqueous electrolytic solution. An upper limit thereof is more preferably 6% by mass or less, still more preferably 3.5% by mass or less, and especially preferably 2.3% by mass or less.

Of the foregoing, when at least one selected from the nitrile compounds (A) is included, in particular, the effect for reducing the metal elution in the high-temperature environment is much more improved, and hence, such is preferred.

In the nonaqueous electrolytic solution of the present invention, the total amount (Cd+Cn) of the content Cd of the compound of the general formula (I) and the total content Cn of the compound corresponding to the nitrile compound (A) is preferably 0.6% by mass or more, and more preferably 1.5% by mass or more, and the upper limit thereof is preferably 11% by mass or less, more preferably 7% by mass or less, and still more preferably 4% by mass or less.

A relation between the content Cd of the compound of the general formula (I) and the content Cn of the nitrile compound is preferably (Cd<Cn). A mass ratio [Cd/Cn] of the content Cd of the compound represented by the general formula (I) to the total content Cn of the compound corresponding to the nitrile compound (A) is preferably 49/51 to 1/99, more preferably 45/55 to 5/95, and still more preferably 40/60 to 10/90. When the mass ratio [Cd/Cn]falls within the aforementioned range, the charging storage properties and the discharging storage properties in the high-temperature environment are much more improved, and hence, such is preferred.

When in addition to the nitrile compound (A), one or more selected from the group consisting of the aromatic compound (B), the S(=O) group-containing compound (D), the phosphorus-containing compound (E), and the cyclic acid anhydride (F) are further contained, and preferably, when in addition to the nitrile compound (A), the S(=O) group-containing compound (D) is further contained, the effect for suppressing the increase of resistance at the time of charging and discharging is more improved while much more improving the effect for reducing the metal elution, and hence, such is preferred.

In the nonaqueous electrolytic solution of the present invention, when the compound represented by the general formula (I) is combined with a nonaqueous solvent and an electrolyte salt, and further other additives as described below, a peculiar effect such that the effect for improving the charging storage properties and the discharging storage properties of the energy storage device when used in the high-temperature and high-voltage environment is synergistically improved is revealed.

[Nonaqueous Solvent]

As the nonaqueous solvent which is used for the nonaqueous electrolytic solution of the present invention, one or more selected from a cyclic carbonate, a linear ester, a lactone, an ether, and an amide are suitably exemplified. In order to synergistically improve the charging storage properties and the discharging storage properties of the energy storage device when used in the high-temperature and high-voltage environment, it is preferred that a linear ester is included, and it is more preferred that both a cyclic carbonate and a linear ester are included.

The term "linear ester" is used as a concept including a linear carbonate and a linear carboxylic acid ester.

<Cyclic Carbonate>

Examples of the cyclic carbonate include one or more selected from ethylene carbonate (EC), propylene carbonate (PC), 1,2-butylene carbonate, 2,3-butylene carbonate, 4-fluoro-1,3-dioxolan-2-one (FEC), trans- or cis-4,5-difluoro-1,3-dioxolan-2-one (the both will be hereunder named generically as "DFEC"), vinylene carbonate (VC), vinyl ethylene carbonate (VEC), and 4-ethynyl-1,3-dioxolan-2-one (EEC). One or more selected from ethylene carbonate (EC), propylene carbonate (PC), 4-fluoro-1,3-dioxolan-2-one (FEC), vinylene carbonate (VC), and 4-ethynyl-1,3-dioxolan-2-one (EEC) are more suitable.

The use of at least one of a cyclic carbonate having an unsaturated bond, such as a carbon-carbon double bond and a carbon-carbon triple bond, and the cyclic carbonate having a fluorine atom as described above is preferred because the charging storage properties and the discharging storage properties of the energy storage device when used in the high-temperature and high-voltage environment are much more improved. It is more preferred that both the cyclic carbonate having an unsaturated bond, such as a carbon-carbon double bond and a carbon-carbon triple bond, and the cyclic carbonate having a fluorine atom are included. As the cyclic carbonate having an unsaturated bond, such as a carbon-carbon double bond and a carbon-carbon triple bond, VC, VEC, or EEC is preferred, and as the cyclic carbonate having a fluorine atom, FEC or DFEC is preferred.

(Content of Cyclic Carbonate)

The content of the cyclic carbonate having an unsaturated bond, such as a carbon-carbon double bond and a carbon-carbon triple bond, is preferably 0.07% by volume or more, more preferably 0.2% by volume or more, and still more preferably 0.7% by volume or more relative to the total volume of the nonaqueous solvent, and an upper limit thereof is preferably 7% by volume or less, more preferably 4% by volume or less, and still more preferably 2.5% by volume or less. When the foregoing content falls within the aforementioned range, the charging storage properties and the discharging storage properties of the energy storage device when used in the high-temperature and high-voltage environment can be more improved without impairing the Li ion permeability, and hence, such is preferred.

The content of the cyclic carbonate having a fluorine atom is preferably 0.07% by volume or more, more preferably 3% by volume or more, and still more preferably 4% by volume or more relative to the total volume of the nonaqueous solvent, and an upper limit thereof is preferably 35% by volume or less, more preferably 25% by volume or less, and still more preferably 15% by volume or less. When the foregoing content falls within the aforementioned range, the charging storage properties and the discharging storage properties of the energy storage device when used in the high-temperature and high-voltage environment can be more improved without impairing the Li ion permeability, and hence, such is preferred.

The cyclic carbonate may be used solely; in the case where a combination of two or more thereof is used, the effect for improving the charging storage properties and the discharging storage properties of the energy storage device when used in the high-temperature and high-voltage environment is more improved, and hence, such is preferred; and the use of a combination of three or more thereof is still more preferred. As a suitable combination of these cyclic carbonates, EC and PC; EC and VC; PC and VC; VC and FEC; EC and FEC; PC and FEC; FEC and DFEC; EC and DFEC; PC and DFEC; VC and DFEC; VEC and DFEC; VC and EEC; EC and EEC; EC, PC and VC; EC, PC and FEC; EC, VC and FEC; EC, VC and VEC; EC, VC and EEC; EC, EEC and FEC; PC, VC and FEC; EC, VC and DFEC; PC, VC and DFEC; EC, PC, VC and FEC; and EC, PC, VC and DFEC are preferred. Among the aforementioned combinations, a combination, such as EC and VC; EC and FEC; PC and FEC; EC, PC and VC; EC, PC and FEC; EC, VC and FEC; EC, VC and EEC; EC, EEC and FEC; PC, VC and FEC; and EC, PC, VC and FEC, is more preferred.

<Linear Ester>

As the linear ester, one or more asymmetric linear carbonates selected from methyl ethyl carbonate (MEC), methyl propyl carbonate (MPC), methyl isopropyl carbonate (MIPC), methyl butyl carbonate, and ethyl propyl carbonate; one or more symmetric linear carbonates selected from the group consisting of dimethyl carbonate (DMC), diethyl carbonate (DEC), dipropyl carbonate, and dibutyl carbonate; and one or more linear carboxylic acid esters selected from the group consisting of pivalate esters, such as methyl pivalate, ethyl pivalate, and propyl pivalate, methyl propionate (MP), ethyl propionate (EP), propyl propionate (PP), methyl acetate (MA), ethyl acetate (EA), propyl acetate (PA), and butyl acetate are suitably exemplified.

Among the aforementioned linear esters, linear esters having a molecular weight of 70 or more and 120 or less and selected from the group consisting of dimethyl carbonate (DMC), methyl ethyl carbonate (MEC), diethyl carbonate (DEC), methyl acetate (MA), ethyl acetate (EA), propyl acetate (PA), butyl acetate, methyl propionate (MP), ethyl propionate (EP), propyl propionate (PP), and methyl pivalate are preferred.

(Content of Linear Ester)

Though the content of the linear ester is not particularly limited, it is preferred to use the linear ester in an amount ranging from 60 to 90% by volume relative to the total volume of the nonaqueous solvent. When the foregoing content is 60% by volume or more, the viscosity of the nonaqueous electrolytic solution does not become excessively high, and when it is 90% by volume or less, there is less concern that an electroconductivity of the nonaqueous electrolytic solution is decreased, whereby the electrochemical characteristics are worsened, and therefore, it is preferred that the content of the linear ester falls within the aforementioned range.

In the case of using the linear carbonate, it is preferred to use two or more thereof. Furthermore, it is more preferred that both the symmetric linear carbonate and the asymmetric linear carbonate are included, and it is still more preferred that the symmetric linear carbonate is included such that its content is more than that of the asymmetric linear carbonate.

A proportion of the volume of the symmetric linear carbonate occupying in the linear carbonate is preferably 51% by volume or more, and more preferably 55% by volume or more. An upper limit thereof is preferably 95% by volume or less, and more preferably 85% by volume or less.

It is especially preferred that dimethyl carbonate (DMC) is included in the symmetric linear carbonate. In addition, it is more preferred that the asymmetric linear carbonate has a methyl group, and methyl ethyl carbonate (MEC) is especially preferred. In the aforementioned case, the charging storage properties and the discharging storage properties of the energy storage device when used in the high-temperature and high-voltage environment are much more improved, and hence, such is preferred.

As the linear ester, it is more preferred that one or more linear carboxylic acid esters having a molecular weight of 70 or more and 120 or less and selected from the group consisting of methyl acetate, ethyl acetate, propyl acetate, butyl acetate, methyl propionate, ethyl propionate (EP), propyl propionate, and methyl pivalate are included; and it is still more preferred that one or more linear carboxylic acid esters having a molecular weight of 85 or more and 120 or less and selected from the group consisting of ethyl acetate, propyl acetate, butyl acetate, methyl propionate, ethyl propionate (EP), propyl propionate, and methyl pivalate are included. The aforementioned case is preferred because the charging storage properties and the discharging storage properties of the energy storage device are more enhanced.

In the case of using the linear carboxylic acid ester, a proportion (content) of the linear carboxylic acid ester occupying in the total volume of the linear ester is preferably 1 to 100% by volume. The aforementioned case is preferred because the charging storage properties and the discharging storage properties of the energy storage device when used in the high-temperature and high-voltage environment are most improved. The foregoing content is more preferably 7% by volume or more, and still more preferably 57% by volume or more relative to the whole of the linear ester, and it is especially preferred to use only the linear carboxylic acid ester.

A proportion of the cyclic carbonate to the linear ester is preferably 10/90 to 45/55, more preferably 15/85 to 40/60, and still more preferably 20/80 to 35/65 in terms of (cyclic carbonate)/(linear ester) (volume ratio) from the viewpoints of charging storage properties and discharging storage properties of the energy storage device when used in the high-temperature and high-voltage environment.

(Other Nonaqueous Solvents)

In the present invention, in addition to the aforementioned nonaqueous solvents, other nonaqueous solvents and so on can be added.

As other nonaqueous solvents, one or more selected from cyclic ethers, such as tetrahydrofuran, 2-methyltetrahydrofuran, and 1,4-dioxane; linear ethers, such as 1,2-dimethoxyethane, 1,2-diethoxyethane, and 1,2-dibutoxyethane; amides, such as dimethylformamide; sulfones, such as sulfolane; and lactones, such as γ-butyrolactone (GBL), γ-valerolactone, and α-angelicalactone, are suitably exemplified.

The aforementioned other nonaqueous solvents are generally mixed and used for the purpose of achieving appropriate physical properties. As for a combination thereof, for example, a combination of a cyclic carbonate, a linear ester (especially a linear carbonate), and a lactone; and a combination of a cyclic carbonate, a linear ester (especially a linear carbonate), and an ether are suitably exemplified, and a combination of a cyclic carbonate, a linear ester (especially a linear carbonate), and a lactone is more preferred. Among the lactones, the use of γ-butyrolactone (GBL) is still more preferred.

The content of other nonaqueous solvents is typically 1% by volume or more, and preferably 2% by volume or more, and it is typically 40% by volume or less, preferably 30% by volume or less, and more preferably 20% by volume or less, relative to the total volume of the nonaqueous solvent.

(Other Additives)

For the purpose of much more improving the electrochemical characteristics in the high-temperature environment, it is possible to further include at least one lithium salt selected from lithium salts having an oxalate structure, lithium salts having a phosphate structure, and lithium salts having an S($=$O) group in the nonaqueous electrolytic solution.

As specific examples of the lithium salt, at least one lithium salt having an oxalate structure and selected from lithium bis(oxalate)borate [LiBOB], lithium difluoro(oxalate)borate [LiDFOB], lithium tetrafluoro(oxalate)phosphate [LiTFOP], and lithium difluorobis(oxalate)phosphate [LiDFOP]; a lithium salt having a phosphate structure, such as $LiPO_2F_2$ and $Li_2PO_3F$; and at least one lithium salt having an S($=$O) group and selected from lithium trifluoro((methanesulfonyl) oxy)borate [LiTFMSB], lithium pentafluoro ((methanesulfonyl)oxy)phosphate [LiPFMSP], lithium methyl sulfate [LMS], lithium ethyl sulfate [LES], lithium 2,2,2-trifluoroethyl sulfate [LFES], and $FSO_3Li$ are suitably exemplified. Of these, it is more preferred that at least one lithium salt selected from LiBOB, LiDFOB, LiTFOP, LiDFOP, $LiPO_2F_2$, LiTFMSB, LMS, LES, LFES, and $FSO_3Li$ is included.

The total content of the lithium salt occupying in the nonaqueous electrolytic solution is preferably 0.001 M or more and 0.5 M or less. When the total content falls within this range, the effect for improving the electrochemical characteristics in the high-temperature environment is much more exhibited. The foregoing total content is preferably 0.01 M or more, more preferably 0.03 M or more, and still more preferably 0.04 M or more. An upper limit thereof is 0.4 M or less, and more preferably 0.2 M or less. Here, M expresses mol/L.

(Electrolyte Salt)

As the electrolyte salt which is used in the present invention, the following lithium salts are suitably exemplified.

As the lithium salt, inorganic lithium salts, such as $LiPF_6$, $LiBF_4$, $LiClO_4$, and $LiN(SO_2F)_2$ [LiFSI]; linear fluoroalkyl group-containing lithium salts, such as $LiN(SO_2CF_3)_2$, $LiN(SO_2C_2F_5)_2$, $LiCF_3SO_3$, $LiC(SO_2CF_3)_3$, $LiPF_4(CF_3)_2$, $LiPF_3(C_2F_5)_3$, $LiPF_3(CF_3)_3$, $LiPF_3(iso-C_3F_7)_3$, and $LiPF_5(iso-C_3F_7)$; and lithium salts having a cyclic fluoroalkylene chain, such as $(CF_2)_2(SO_2)_2NLi$ and $(CF_2)_3(SO_2)_2NLi$, are suitably exemplified. These can be used solely or in admixture of two or more thereof.

Among these, one or more selected from $LiPF_6$, $LiBF_4$, $LiN(SO_2CF_3)_2$, $LiN(SO_2C_2F_5)_2$, and $LiN(SO_2F)_2$ [LiFSI] are preferred, and the use of $LiPF_6$ is more preferred.

In general, a concentration of the electrolyte salt is preferably 0.3 M or more, more preferably 0.7 M or more, and still more preferably 1.1 M or more in the nonaqueous electrolytic solution. In addition, an upper limit thereof is preferably 2.5 M or less, more preferably 2.0 M or less, and still more preferably 1.6 M or less.

As for a suitable combination of these electrolyte salts, the case where not only $LiPF_6$ but also at least one lithium salt selected from $LiBF_4$, $LiN(SO_2CF_3)_2$, and $LiN(SO_2F)_2$ [LiFSI] is included in the nonaqueous electrolytic solution is preferred.

When a proportion of the lithium salt other than $LiPF_6$ occupying in the nonaqueous electrolytic solution is 0.001 M or more, the effect for improving the electrochemical characteristics in the high-temperature environment is readily exhibited, and when it is 1.0 M or less, there is less concern that the effect for improving the electrochemical characteristics in the high-temperature environment is worsened, and hence, such is preferred. The proportion of the lithium salt other than $LiPF_G$ occupying in the nonaqueous electrolytic solution is preferably 0.01 M or more, more preferably 0.03 M or more, and still more preferably 0.04 M or more. An upper limit thereof is preferably 0.8 M or less, more preferably 0.6 M or less, and still more preferably 0.4 M or less.

[Production of Nonaqueous Electrolytic Solution]

The nonaqueous electrolytic solution of the present invention can be, for example, obtained by mixing the aforementioned nonaqueous solvent and adding the compound represented by the general formula (I) and optionally, at least one compound selected from the group consisting of (A) a nitrile compound, (B) an aromatic compound, (C) an isocyanate compound, (D) an S(=O) group-containing compound, (E) a phosphorus-containing compound, (F) a cyclic acid anhydride, (G) a phosphazene compound, and (H) a carbon-carbon triple bond-containing compound to the aforementioned electrolyte salt and the nonaqueous electrolytic solution.

On this occasion, the nonaqueous solvent to be used and the compound to be added to the nonaqueous electrolytic solution are preferably purified in advance to decrease impurities as far as possible within a range where the productivity is not remarkably worsened.

The nonaqueous electrolytic solution of the present invention can be used in first to fourth energy storage devices shown below, and as the nonaqueous electrolytic solution, not only one in the form of a liquid but also one in the form of a gel may be used. Furthermore, the nonaqueous electrolytic solution of the present invention can also be used for a solid polymer electrolyte. Above all, the nonaqueous electrolytic solution is preferably used in the first energy storage device using a lithium salt as the electrolyte salt (namely, for a lithium battery) or in the fourth energy storage device (namely, for a lithium ion capacitor), more preferably used for a lithium battery, and most preferably used for a lithium secondary battery.

[First Energy Storage Device (Lithium Battery)]

In this specification, the lithium battery is a generic name for a lithium primary battery and a lithium secondary battery. In addition, in this specification, the term "lithium secondary battery" is used as a concept also including a so-called lithium ion secondary battery.

The lithium battery that is the first energy storage device of the present invention includes a positive electrode, a negative electrode, and the aforementioned nonaqueous electrolytic solution having an electrolyte salt dissolved in a nonaqueous solvent. Other constitutional members than the nonaqueous electrolytic solution, such as the positive electrode and the negative electrode, can be used without being particularly limited.

For example, as a positive electrode active material for a lithium secondary battery, a complex metal oxide of lithium containing one or more selected from the group consisting of cobalt, manganese, and nickel is used. These positive electrode active materials can be used solely or in combination of two or more thereof.

As such a lithium complex metal oxide, for example, one or more selected from $LiCoO_2$, $LiCo_{1-x}M_xO_2$ (wherein M is one or more elements selected from Sn, Mg, Fe, Ti, Al, Zr, Cr, V, Ga, Zn, and Cu; and $0.001 \leq x \leq 0.05$), $LiMn_2O_4$, $LiNiO_2$, $LiCo_{1-x}Ni_xO_2$ ($0.01 < x < 1$), $LiCo_{1/3}Ni_{1/3}Mn_{1/3}O_2$, $LiNi_{0.5}Co_{0.3}Mn_{0.2}O_2$, $LiNi_{0.5}Mn_{0.3}Co_{0.2}O_2$, $LiNi_{0.8}Mn_{0.1}Co_{0.1}O_2$, $LiNi_{0.8}Co_{0.15}Al_{0.05}O_2$, a solid solution of $Li_2MnO_3$ and $LiMO_2$ (wherein M is a transition metal, such as Co, Ni, Mn, and Fe), and $LiNi_{1/2}Mn_{3/2}O_4$ are suitably exemplified, and two or more thereof are more suitable. In addition, these materials may also be used as a combination, such as a combination of $LiCoO_2$ and $LiMn_2O_4$, a combination of $LiCoO_2$ and $LiNiO_2$, and a combination of $LiMn_2O_4$ and $LiNiO_2$.

In general, when the lithium complex metal oxide capable of acting at a higher charged voltage is used, the electrochemical characteristics in the high-temperature environment is liable to be worsened due to the reaction with the electrolytic solution at the time of charging; however, in the lithium secondary battery according to the present invention, worsening of such electrochemical characteristics can be suppressed.

In particular, when a positive electrode active material including Ni is used, in general, decomposition of the nonaqueous solvent occurs on the surface of the positive electrode due to a catalytic action of Ni, so that the resistance of the battery is liable to increase. In particular, though the electrochemical characteristics in the high-temperature environment are liable to be worsened, in the lithium secondary battery according to the present invention, worsening of such electrochemical characteristics can be suppressed, and hence, such is preferred. In particular, in the case of using a positive electrode active material in which a proportion of the atomic concentration of Ni is more than 10 atomic % relative to the atomic concentration of all of transition metal elements in the positive electrode active material, the aforementioned effect becomes remarkable, and hence, such is preferred. The use of 20 atomic % or more of the positive electrode active material is more preferred, and the use of 30 atomic % or more of the positive electrode active material is still more preferred. Specifically, $LiCo_{1/3}Ni_{1/3}Mn_{1/3}O_2$, $LiNi_{0.5}Co_{0.3}Mn_{0.2}O_2$, $LiNi_{0.5}Mn_{0.3}Co_{0.2}O_2$, $LiNi_{0.8}Mn_{0.1}Co_{0.1}O_2$, and $LiNi_{0.8}Co_{0.15}Al_{0.05}O_2$ are suitably exemplified.

Furthermore, a lithium-containing olivine-type phosphate can also be used as the positive electrode active material. In particular, a lithium-containing olivine-type phosphate including one or more selected from the group consisting of iron, cobalt, nickel, and manganese is preferred. Specific examples thereof include $LiFePO_4$, $LiCoPO_4$, $LiNiPO_4$, and $LiMnPO_4$.

A part of such a lithium-containing olivine-type phosphate may be substituted with other element. A part of iron, cobalt, nickel, or manganese may be substituted with at least one element selected from Co, Mn, Ni, Mg, Al, B, Ti, V, Nb, Cu, Zn, Mo, Ca, Sr, W, and Zr, or the lithium-containing olivine-type phosphate can also be coated with a compound containing any of these other elements or with a carbon material. Among these, $LiFePO_4$ or $LiMnPO_4$ is preferred.

The lithium-containing olivine-type phosphate can also be used, for example, in admixture with the aforementioned positive electrode active material.

Examples of the positive electrode for a lithium primary battery include an oxide or chalcogen compound of one or more metal elements, such as $CuO$, $Cu_2O$, $Ag_2O$, $Ag_2CrO_4$, $CuS$, $CuSO_4$, $TiO_2$, $TiS_2$, $SiO_2$, $SnO$, $V_2O_5$, $V_6O_{12}$, $VO_x$, $Nb_2O_5$, $Bi_2O_3$, $Bi_2Pb_2O_5$, $Sb_2O_3$, $CrO_3$, $Cr_2O_3$, $MoO_3$, $WO_3$, $SeO_2$, $MnO_2$, $Mn_2O_3$, $Fe_2O_3$, $FeO$, $Fe_3O_4$, $Ni_2O_3$, $NiO$, $CoO_3$, and $CoO$; a sulfur compound, such as $SO_2$ and $SOCl_2$; and a carbon fluoride (graphite fluoride) represented by a general formula $(CF_x)_n$. Among these, $MnO_2$, $V_2O_5$, and graphite fluoride are preferred.

An electroconductive agent of the positive electrode is not particularly limited so long as it is an electron-conductive material which does not undergo chemical change. Examples thereof include graphites, such as natural graphite (e.g., flaky graphite) and artificial graphite; and carbon blacks, such as acetylene black, Ketjen black, channel black, furnace black, lamp black, and thermal black. In addition, the graphite and the carbon black may be appropriately mixed and used. The amount of the electroconductive agent added to a positive electrode mixture is preferably 1 to 10% by mass, and more preferably 2 to 5% by mass.

The positive electrode can be produced in such a way that the positive electrode active material is mixed with an electroconductive agent, such as acetylene black and carbon black, and a binder, such as polytetrafluoroethylene (PTFE), polyvinylidene fluoride (PVDF), a copolymer of styrene and butadiene (SBR), a copolymer of acrylonitrile and butadiene (NBR), carboxymethyl cellulose (CMC), and an ethylene-propylene-diene terpolymer, to which is then added a high-boiling point solvent, such as 1-methyl-2-pyrrolidone, followed by kneading to provide a positive electrode mixture, and this positive electrode mixture is applied onto a collector, such as an aluminum foil and a stainless steel-made lath plate, dried, shaped under pressure, and then heat-treated in vacuum at a temperature of about 50° C. to 250° C. for about 2 hours.

A density of the positive electrode except for the collector is typically 1.5 g/cm$^3$ or more, and for the purpose of further increasing a capacity of the battery, the density is preferably 2 g/cm$^3$ or more, more preferably 3 g/cm$^3$ or more, and still more preferably 3.6 g/cm$^3$ or more. In addition, an upper limit thereof is preferably 4 g/cm$^3$ or less.

As a negative electrode active material for a lithium secondary battery, one or more selected from the group consisting of metal lithium, a lithium alloy, a carbon material capable of absorbing and releasing a lithium ion [e.g., graphitizable carbon, non-graphitizable carbon having a lattice (002) spacing ($d_{002}$) of 0.37 nm or more, and graphite having a lattice (002) spacing ($d_{002}$) of 0.34 nm or less], tin (elemental substance), a tin compound, silicon (elemental substance), a silicon compound, and a lithium titanate compound, such as $Li_4Ti_5O_{12}$, can be used.

Among these, in the ability of absorbing and releasing a lithium ion, the use of a high-crystalline carbon material, such as artificial graphite and natural graphite, is more preferred, and the use of a carbon material having a graphite-type crystal structure in which a lattice (002) spacing ($d_{002}$) is 0.340 nm (nanometers) or less, and especially 0.335 to 0.337 nm, is especially preferred.

The use of artificial graphite particles having a bulky structure containing plural flattened graphite fine particles which are aggregated or bonded non-parallel to each other, or graphite particles produced, for example, through a spheroidizing treatment of flaky natural graphite particles by repeatedly applying a mechanical action, such as a compression force, a friction force, and a shear force, is preferred. When a ratio $I(110)/I(004)$ of a peak intensity $I(110)$ of a (110) plane to a peak intensity $I(004)$ of a (004) plane of the graphite crystal obtained through X-ray diffractometry of a negative electrode sheet at the time of shaping under pressure to such an extent that a density of the negative electrode except for the collector is 1.5 g/cm$^3$ or more is 0.01 or more, the metal elution from the positive electrode active material is much more reduced, and the charging storage properties are improved, and hence, such is preferred. The ratio $I(110)/I(004)$ is more preferably 0.05 or more, and still more preferably 0.1 or more. In addition, an upper limit of the ratio $I(110)/I(004)$ is preferably 0.5 or less, and more preferably 0.3 or less because there may be the case where the crystallinity is worsened to lower the discharge capacity of the battery due to an excessive treatment.

When the high-crystalline carbon material (core material) is coated with a carbon material having lower crystallinity than the core material, the electrochemical characteristics in the high-temperature environment become much more favorable, and hence, such is preferred. The crystallinity of the carbon material in the coating can be confirmed with a transmission electron microscope (TEM).

When the high-crystalline carbon material is used, in general, there is a tendency that it reacts with the nonaqueous electrolytic solution at the time of charging, thereby worsening the electrochemical characteristics at a low temperature or a high temperature due to an increase of interfacial resistance. However, in the lithium secondary battery according to the present invention, the electrochemical characteristics in the high-temperature environment become favorable.

Examples of the metal compound capable of absorbing and releasing a lithium ion as a negative electrode active material include compounds containing at least one metal element, such as Si, Ge, Sn, Pb, P, Sb, Bi, Al, Ga, In, Ti, Mn, Fe, Co, Ni, Cu, Zn, Ag, Mg, Sr, and Ba. Though such a metal compound may be in any form including an elemental substance, an alloy, an oxide, a nitride, a sulfide, a boride, and an alloy with lithium, any of an elemental substance, an alloy, an oxide, and an alloy with lithium are preferred because the battery capacity can be increased. Among these, a compound containing at least one element selected from Si, Ge, and Sn is preferred, and a compound containing at least one element selected from Si and Sn is more preferred because the battery capacity can be increased.

The negative electrode can be produced in such a way that the same electroconductive agent, binder, and high-boiling point solvent as in the production of the positive electrode as described above are used and kneaded to provide a negative electrode mixture, and this negative electrode mixture is then applied onto a collector, such as a copper foil, dried, shaped under pressure, and then heat-treated in vacuum at a temperature of about 50° C. to 250° C. for about 2 hours.

A density of the negative electrode except for the collector is typically 1.1 g/cm$^3$ or more, and for the purpose of further increasing a capacity of the battery, the density is preferably 1.5 g/cm$^3$ or more, and especially preferably 1.7 g/cm$^3$ or more. An upper limit thereof is preferably 2 g/cm$^3$ or less.

Examples of the negative electrode active material for a lithium primary battery include metal lithium and a lithium alloy.

The structure of the lithium battery is not particularly limited, and can be a coin-type battery, a cylinder-type battery, a prismatic battery, a laminate-type battery, or the like, each having a single-layered or multi-layered separator.

The separator for the battery is not particularly limited, and a single-layered or laminated micro-porous film of a polyolefin, such as polypropylene, polyethylene, and an ethylene-propylene copolymer, a woven fabric, a nonwoven fabric, and the like can be used.

The lithium secondary battery in the present invention has excellent electrochemical characteristics in the high-temperature environment even when a final charging voltage is 4.2 V or more, particularly 4.3 V or more, and furthermore, the characteristics are favorable even at 4.4 V or more. A final discharging voltage can be typically 2.8 V or more, and further 2.5 V or more; however, the final discharging voltage of the lithium secondary battery in the present invention can be 2.0 V or more. Though an electric current value is not particularly limited, in general, the battery is used within a range of 0.1 to 30 C. In addition, the lithium battery in the present invention can be charged and discharged at −40 to 100° C., and preferably −10 to 80° C.

In the present invention, as a countermeasure against the increase in the internal pressure of the lithium battery, there can also be adopted such a method that a safety valve is provided in a battery cap, or a cutout is provided in a component, such as a battery can and a gasket. In addition, as a safety countermeasure for prevention of overcharging, a circuit cut-off mechanism capable of detecting the internal pressure of the battery to cut off the current can be provided in the battery cap.

[Second Energy Storage Device (Electric Double Layer Capacitor)]

The second energy storage device of the present invention is an energy storage device including the nonaqueous electrolytic solution of the present invention and storing energy by utilizing an electric double layer capacity in an interface between the electrolytic solution and the electrode. One example of the present invention is an electric double layer capacitor. A most typical electrode active material which is used in this energy storage device is active carbon. The double layer capacity increases substantially in proportion to a surface area.

[Third Energy Storage Device]

The third energy storage device of the present invention is an energy storage device including the nonaqueous electrolytic solution of the present invention and storing energy by utilizing a doping/dedoping reaction of the electrode. Examples of the electrode active material which is used in this energy storage device include a metal oxide, such as ruthenium oxide, iridium oxide, tungsten oxide, molybdenum oxide, and copper oxide, and a π-conjugated polymer, such as polyacene and a polythiophene derivative. A capacitor using such an electrode active material is capable of storing energy following the doping/dedoping reaction of the electrode.

[Fourth Energy Storage Device (Lithium Ion Capacitor)]

The fourth energy storage device of the present invention is an energy storage device including the nonaqueous electrolytic solution of the present invention and storing energy by utilizing intercalation of a lithium ion into a carbon material, such as graphite, as the negative electrode. This energy storage device is called a lithium ion capacitor (LIC). Examples of the positive electrode include one utilizing an electric double layer between an active carbon electrode and an electrolytic solution and one utilizing a doping/dedoping reaction of a π-conjugated polymer electrode. The electrolytic solution includes at least a lithium salt, such as LiPF$_6$.

EXAMPLES

Examples of a nonaqueous electrolytic solution and an energy storage device each using the compound according to the present invention are hereunder described, but it should be construed that the present invention is not limited to these Examples.

Examples 1 to 30 and Comparative Examples 1 to 4

[Production of Lithium Ion Secondary Battery]

92% by mass of LiNi$_{0.5}$Co$_{0.3}$Mn$_{0.2}$O$_2$ and 5% by mass of acetylene black (electroconductive agent) were mixed, and the mixture was added to and mixed with a solution which had been prepared by dissolving 3% by mass of polyvinylidene fluoride (binder) in 1-methyl-2-pyrrolidone in advance, thereby preparing a positive electrode mixture paste. This positive electrode mixture paste was applied onto one surface of an aluminum foil (collector), dried, and then treated under pressure, followed by cutting into a predetermined size, thereby producing a positive electrode sheet. A density of the positive electrode except for the collector was 3.6 g/cm$^3$.

5% by mass of silicon (elemental substance) and 90% by mass of artificial graphite (d$_{002}$=0.335 nm, negative electrode active material) were added to and mixed with a solution which had been prepared by dissolving 5% by mass of polyvinylidene fluoride (binder) in 1-methyl-2-pyrrolidone in advance, thereby preparing a negative electrode mixture paste. This negative electrode mixture paste was applied onto one surface of a copper foil (collector), dried, and then treated under pressure, followed by cutting into a predetermined size, thereby producing a negative electrode sheet. A density of the negative electrode except for the collector was 1.5 g/cm$^3$. In addition, this electrode sheet was used and analyzed by X-ray diffractometry. As a result, a ratio [I(110)/I(004)] of the peak intensity I(110) of the (110) plane to the peak intensity I(004) of the (004) plane of the graphite crystal was 0.1.

The above-obtained positive electrode sheet, a microporous polyethylene film-made separator, and the above-obtained negative electrode sheet were laminated in this order, and a nonaqueous electrolytic solution having each of compositions shown in Tables 1 and 4 was added, thereby producing a laminate-type battery.

[Evaluation of High-Temperature Charging Storage Properties]
<Initial Discharge Capacity and Impedance>

In a thermostatic chamber at 25° C., the laminate-type battery produced by the aforementioned method was used and charged up to a final voltage of 4.4 V with a constant current of 0.2 C and under a constant voltage for 7 hours and then discharged down to a final voltage of 2.5 V with a constant current of 0.2 C, thereby determining an initial discharge capacity. Thereafter, in a thermostatic chamber at 25° C., an impedance at 1 kHz was measured, thereby determining an initial impedance.

<High-Temperature Charging Storage Test>

Subsequently, in a thermostatic chamber at 85° C., this laminate-type battery was charged up to a final voltage of 4.4 V with a constant current of 0.2 C and under a constant voltage for 7 hours and then stored for 7 days in an open circuit state. Thereafter, the battery was placed in a thermostatic chamber at 25° C., and once discharged down to a final voltage of 2.5 V under a constant current of 1 C.

Subsequently, in a thermostatic chamber at 25° C., the battery was charged up to a final voltage of 4.4 V with a constant current of 0.2 C and under a constant voltage for 7 hours and then discharged down to a final voltage of 2.5 V with a constant current of 0.2 C, thereby determining a recovery discharge capacity after charging storage. A capacity recovery rate after high-temperature charging storage was determined according to the following formula.

Capacity recovery rate (%) after charging storage=
(Recovered discharge capacity)/(Initial discharge capacity)×100

Furthermore, in a thermostatic chamber at 25° C., the laminate-type battery was then measured for an impedance at 1 kHz, thereby determining an impedance after charging storage. An impedance change rate after charging storage was determined according to the following formula.

Impedance change rate (%) after charging storage=
(Impedance after charging storage)/(Initial impedance)×100

[Evaluation of High-Temperature Discharging Storage Properties]
<Metal Elution Amount in Electrolytic Solution after High-Temperature Discharging Storage>

In a thermostatic chamber at 25° C., a laminate-type battery produced in the same way as in the aforementioned method was used and charged up to a final voltage of 4.4 V with a constant current of 0.2 C and under a constant voltage for 7 hours and then discharged down to a final voltage of 2.5 V with a constant current of 0.2 C.

Subsequently, this laminate-type battery was placed in a thermostat at 85° C. and then stored for 14 days in an open circuit state. Thereafter, the battery was placed in a thermostatic chamber at 25° C. and thoroughly cooled, and the electrolytic solution was then extracted from the laminate-type battery. Then, the concentration of a Cu ion in the electrolytic solution (metal elution from the negative electrode collector) was quantitatively determined by ICP-MS (inductively coupled plasma mass spectrometry).

As for the metal elution amount after high-temperature discharging storage, a relative value was determined on a basis when the metal elution amount of Comparative Example 1 was defined as 100%.

Production conditions and battery characteristics of each of the batteries are shown in Tables 1 to 4.

TABLE 1

| | Composition of electrolyte salt Composition of nonaqueous electrolytic solution (Volume ratio of solvent) | Compound of general formula (I) | | Capacity recovery rate after charging storage (%) | Impedance change rate after charging storage (%) | Metal elution amount after discharging storage (%) |
|---|---|---|---|---|---|---|
| | | Kind | Addition amount (%) | | | |
| Example 1 | 1.1M LiPF6 EC/MEC/DEC (30/25/45) | 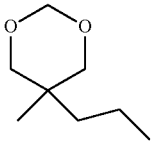 | 1.2 | 80 | 128 | 18 |
| Example 2 | 1.1M LiPF6 EC/VC/FEC/MEC/DEC (25/1/5/25/45) | | 0.2 | 81 | 128 | 17 |
| Example 3 | 1.1M LiPF6 EC/VC/FEC/MEC/DEC (25/1/5/25/45) | | 1.2 | 84 | 125 | 13 |
| Example 4 | 1.1M LiPF6 EC/VC/FEC/MEC/DEC (25/1/5/25/45) | | 2.5 | 83 | 125 | 14 |
| Example 5 | 1.1M LiPF6 EC/VC/FEC/MEC/DEC (25/1/5/25/45) | | 4 | 82 | 127 | 16 |
| Example 6 | 1.1M LiPF6 EC/VC/FEC/MEC/DEC (25/1/5/25/45) | 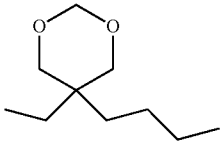 | 1.2 | 81 | 129 | 16 |

TABLE 1-continued

| | Composition of electrolyte salt Composition of nonaqueous electrolytic solution (Volume ratio of solvent) | Compound of general formula (I) Kind | Addition amount (%) | Capacity recovery rate after charging storage (%) | Impedance change rate after charging storage (%) | Metal elution amount after discharging storage (%) |
|---|---|---|---|---|---|---|
| Example 7 | 1.1M LiPF6 EC/VC/FEC/DEC/PP (19/1/10/30/40) | 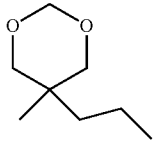 | 1.2 | 83 | 123 | 11 |
| Example 8 | 1.1M LiPF6 EC/VC/FEC/DEC/PP (19/1/10/30/40) | 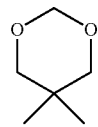 | 1.2 | 82 | 127 | 15 |
| Example 9 | 1.1M LiPF6 EC/VC/FEC/PP (19/1/10/70) | 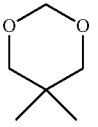 | 1.2 | 84 | 125 | 13 |

TABLE 2

| | Composition of electrolyte salt Composition of nonaqueous electrolytic solution (Volume ratio of solvent) | Compound of general formula (I) | | Compound other than general formula (I) | | Capacity recovery rate after charging storage (%) | Impedance change rate after charging storage (%) | Metal elution amount after discharging storage (%) |
|---|---|---|---|---|---|---|---|---|
| | | Kind | Addition amount (%) | Kind | Addition amount (%) | | | |
| Example 10 | 1.1M LiPF6 EC/VC/FEC/MEC/DEC (25/1/5/25/45) |  | 0.4 | Adiponitrile | 2 | 75 | 136 | 25 |
| Example 11 | 1.1M LiPF6 EC/VC/FEC/MEC/DEC (25/1/5/25/45) | | 0.2 | | 3.6 | 74 | 138 | 28 |
| Example 12 | 1.1M LiPF6 EC/VC/FEC/MEC/DEC (25/1/5/25/45) | | 0.2 | | 0.3 | 71 | 141 | 32 |
| Example 13 | 1.1M LiPF6 EC/VC/FEC/MEC/DEC (25/1/5/25/45) | | 1.2 | | 1.1 | 76 | 135 | 21 |
| Example 14 | 1.1M LiPF6 EC/VC/FEC/MEC/DEC (25/1/5/25/45) | | 1.2 | | 2 | 78 | 131 | 19 |
| Example 15 | 1.1M LiPF6 EC/VC/FEC/MEC/DEC (25/1/5/25/45) | | 1.2 | | 2.4 | 77 | 133 | 20 |
| Example 16 | 1.1M LiPF6 EC/VC/FEC/MEC/DEC (25/1/5/25/45) | | 3 | | 2 | 69 | 140 | 31 |
| Example 17 | 1.1M LiPF6 EC/VC/FEC/MEC/DEC (25/1/5/25/45) | | 1.5 | | 5 | 70 | 139 | 30 |
| Example 18 | 1.1M LiPF6 EC/VC/FEC/MEC/DEC (25/1/5/25/45) | | 4 | | 5.5 | 68 | 148 | 38 |
| Example 19 | 1.0M LiPF6 + 0.1M LiPO2F2 EC/VC/FEC/MEC/DEC (25/1/5/25/45) | | 1.2 | | 2 | 80 | 128 | 17 |
| Example 20 | 1.1M LiPF6 EC/VC/FEC/DEC/PP (19/1/10/65/5) | | 1.2 | | 2 | 79 | 129 | 18 |

TABLE 2-continued

| | Composition of electrolyte salt Composition of nonaqueous electrolytic solution (Volume ratio of solvent) | Compound of general formula (I) | | Compound other than general formula (I) | | Capacity recovery rate after charging storage (%) | Impedance change rate after charging storage (%) | Metal elution amount after discharging storage (%) |
|---|---|---|---|---|---|---|---|---|
| | | Kind | Addition amount (%) | Kind | Addition amount (%) | | | |
| Example 21 | 1.1M LiPF6 EC/VC/FEC/DEC/PP (19/1/10/30/40) | | 1.2 | | 2 | 84 | 125 | 14 |
| Example 22 | 1.1M LiPF6 EC/VC/FEC/PP (19/1/10/70) | | 1.2 | | 2 | 86 | 123 | 11 |
| Example 23 | 1.1M LiPF6 EC/VC/FEC/MEC/DEC (25/1/5/25/45) | | 1.2 | Succinonitrile | 2 | 77 | 132 | 20 |
| Example 24 | 1.1M LiPF6 EC/VC/FEC/MEC/DEC (25/1/5/25/45) | | 1.2 | 1,3,6-Hexane-tricarbonitrile | 2 | 80 | 128 | 17 |
| Example 25 | 1.1M LiPF6 EC/VC/FEC/MEC/DEC (25/1/5/25/45) | | 1.2 | Suberonitrile | 2 | 82 | 126 | 15 |

TABLE 3

| | Composition of electrolyte salt Composition of nonaqueous electrolytic solution (Volume ratio of solvent) | Compound of general formula (I) | | Compound other than general formula (I) | | Capacity recovery rate after charging storage (%) | Impedance change rate after charging storage (%) | Metal elution amount after discharging storage (%) |
|---|---|---|---|---|---|---|---|---|
| | | Kind | Addition amount (%) | Kind | Addition amount (%) | | | |
| Comparative Example 1 | 1.1M LiPF6 EC/VC/FEC/MEC/DEC (25/1/5/25/45) |  | 1.2 | Adiponitrile | 2 | 62 | 182 | 100 |
| Comparative Example 2 | 1.1M LiPF6 EC/VC/FEC/MEC/DEC (25/1/5/25/45) | | 1.2 | | 2 | 59 | 189 | 108 |
| Comparative Example 3 | 1.1M LiPF6 EC/VC/FEC/MEC/DEC (25/1/5/25/45) | | 1.2 | | 2 | 56 | 192 | 110 |
| Comparative Example 4 | 1.0M LiPF6 + 0.1M LiPO2F2 EC/VC/FEC/MEC/DEC (25/1/5/25/45) | | 1.2 | | 2 | 65 | 179 | 72 |

TABLE 4

| | Composition of electrolyte salt | Compound of general formula (I) | | Compound other than general formula (I) | | Capacity recovery rate after charging storage (%) | Impedance change rate after charging storage (%) | Metal elution amount after discharging storage (%) |
|---|---|---|---|---|---|---|---|---|
| | Composition of nonaqueous electrolytic solution (Volume ratio of solvent) | Kind | Addition amount (%) | Compound (A) (Addition amount (%)) | Compound (B) – (H) (Addition amount (%)) | | | |
| Example 26 | 1.1M LiPF6 EC/VC/FEC/MEC/DEC (25/1/5/25/45) | 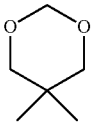 | 1.2 | Adiponitrile (2) | (D) Ethylene sulfate (1.6) | 82 | 126 | 15 |
| Example 27 | 1.1M LiPF6 EC/VC/FEC/MEC/DEC (25/1/5/25/45) | | | | (D) Pentafluorophenyl methanesulfonate (1.6) | 81 | 128 | 16 |
| Example 28 | 1.1M LiPF6 EC/VC/FEC/MEC/DEC (25/1/5/25/45) | | | | (E) Ethyl 2-(diethoxy-phosphoryl)acetate (1.6) | 80 | 128 | 17 |
| Example 29 | 1.1M LiPF6 + 0.3 M LiFSI EC/VC/FEC/MEC/DEC (25/1/5/25/45) | | | | (B) Fluorobenzene (1.6) | 79 | 127 | 16 |
| Example 30 | 1.1M LiPF6 EC/VC/FEC/MEC/DEC (25/1/5/25/45) | | | | (F) Succinic anhydride (1.6) | 80 | 130 | 18 |

All of the lithium secondary batteries of Examples 1 to 30 are remarkably improved in the charging storage properties and the discharging storage properties and are able to much more reduce the metal elution amount, as compared with the lithium secondary batteries of Comparative Examples 1 to 4 including the 1,3-dioxane compound which is different from the compound represented by the general formula (I). In the light of the above, it is noted that the effects of the present invention are a peculiar effect in the case of containing a specified amount of the compound represented by the general formula (I) according to the present invention in the nonaqueous electrolytic solution having an electrolyte salt dissolved in a nonaqueous solvent.

Furthermore, the nonaqueous electrolytic solution of the present invention also has an effect for improving the charging storage properties and the discharging storage properties of an energy storage device when used in the high-temperature and high-voltage environment of a lithium primary battery, a lithium ion capacitor, a lithium air battery, and so on.

INDUSTRIAL APPLICABILITY

By using the nonaqueous electrolytic solution of the present invention, it is possible to obtain an energy storage device which is excellent in the charging storage properties and the discharging storage properties of an energy storage device when used in the high-temperature and high-voltage environment. In particular, in the case of being used as a nonaqueous electrolytic solution for an energy storage device to be mounted in a hybrid electric vehicle, a plug-in hybrid electric vehicle, a battery electric vehicle, and so on, it is possible to obtain an energy storage device capable of improving the charging storage properties and the discharging storage properties of an energy storage device when used in the high-temperature and high-voltage environment.

The invention claimed is:

1. A nonaqueous electrolytic solution for an energy storage device, which has a lithium salt as an electrolyte salt dissolved in a nonaqueous solvent comprising a linear ester and a cyclic carbonate, the nonaqueous electrolytic solution comprising 0.1 to 5% by mass of a compound represented by the following general formula, (I)

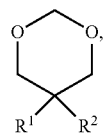
(I)

wherein $R^1$ and $R^2$ each independently represent an alkyl group having 1 to 4 carbon atoms.

2. The nonaqueous electrolytic solution according to claim 1, wherein the compound represented by the general formula (I) is one or more selected from the group consisting of 5,5-dimethyl-1,3-dioxane, 5-ethyl-5-methyl-1,3-dioxane, 5-methyl-5-propyl-1,3-dioxane, 5,5-diethyl-1,3-dixoane, 5-ethyl-5-propyl-1,3-dioxane, and 5-butyl-5-ethyl-1.3-dioxane.

3. The nonaqueous electrolytic solution according to claim 1, wherein the compound represented by the general formula (I) is an asymmetric compound in which $R^1$ and $R^2$ in the general formula (I) are different from each other.

4. The nonaqueous electrolytic solution according to claim 1, wherein the linear ester has a molecular weight of 70 or more and 120 or less in an amount ranging from 60 to 80% by volume relative to the total volume of the nonaqueous solvent.

5. The nonaqueous electrolytic solution according to claim 4, wherein the linear ester having a molecular weight of 70 or more and 120 or less comprises one or more linear carboxylic acid esters selected from the group consisting of methyl acetate, ethyl acetate, propyl acetate, butyl acetate, methyl propionate, ethyl propionate, propyl propionate, and methyl pivalate, and a proportion of the linear carboxylic acid ester is 1 to 100% by volume relative to the total volume of the linear ester.

6. The nonaqueous electrolytic solution according to claim 1, wherein the cyclic carbonate comprises at least one of a cyclic carbonate having an unsaturated bond of a carbon-carbon double bond or a carbon-carbon triple bond and a cyclic carbonate having a fluorine atom.

7. The nonaqueous electrolytic solution according to claim 6, further comprising one or more selected from the group consisting of an aromatic compound, an S(=O) group-containing compound, a phosphorus-containing compound, and a cyclic acid anhydride.

8. The nonaqueous electrolytic solution according to claim 1, further comprising a nitrile compound.

9. The nonaqueous electrolytic solution according to claim 8, wherein the nitrile compound is one or more polyvalent nitriles having two or more intermediate carbon chains between the CN group and the CN group and selected from the group consisting of succinonitrile, glutaronitrile, adiponitrile, pimelonitrile, suberonitrile, sebaconitrile, 1,3,5-hexanetricarbonitrile, 1,3,6-hexanetricarbonitrile, 1,2,3-propanetricarbonitrile, and 1,3,5-pentanetricarbonitrile.

10. The nonaqueous electrolytic solution according to claim 9, Wherein the nitrile compound is a polyvalent nitrile having 5 or more and 8 or less intermediate carbon chains between the CN group and the CN group and selected from the group consisting of pimelonitrile, suberonitrile, and sebaconitrile.

11. The nonaqueous electrolytic solution according to claim 8, wherein a total amount (Cd+Cn) of a content of the compound of the general formula (I), Cd, and a content of the nitrile compound Cn, is 0.6% by mass or more and 7% by mass or less in the nonaqueous electrolytic solution.

12. The nonaqueous electrolytic solution according to claim 8, Wherein a relation between content of the compound of the general formula (I), Cd, and a content of the nitrile compound, Cu, Cd<Cn.

13. The nonaqueous electrolytic solution according to claim 1, wherein the lithium salt is $LiPF_6$.

14. An energy storage device comprising a positive electrode, a negative electrode, and a nonaqueous electrolytic solution having a lithium salt as an electrolyte salt dissolved in a nonaqueous solvent comprising a linear ester and a cyclic carbonate, the nonaqueous electrolytic solution being a nonaqueous electrolytic solution comprising 0.1 to 5% by mass of a compound represented by the following general formula, (I)

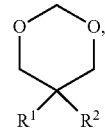

(I)

wherein $R^1$ and $R^2$ each independently represent an alkyl group having 1 to 4 carbon atoms.

15. The energy storage device according to claim 14, wherein the lithium salt is $LiPF_6$.

16. The energy storage device according to claim 14, wherein the positive electrode comprises, as a positive electrode active material, a complex metal oxide of lithium containing one or more selected from the group consisting of cobalt, manganese, and nickel, or a lithium-containing olivine-type phosphate containing one or more selected from the group consisting of iron, cobalt, nickel, and manganese.

17. The energy storage device according to claim 14, wherein the negative electrode comprises, as a negative electrode active material, one or more selected from the group consisting of metal lithium, a lithium alloy, a carbon material capable of absorbing and releasing a lithium ion, tin, a tin compound, silicon, a silicon compound, and a lithium titanate compound.

* * * * *